J. H. LYSINGER.
SPRING WHEEL.
APPLICATION FILED JUNE 1, 1914.
1,135,458.
Patented Apr. 13, 1915.
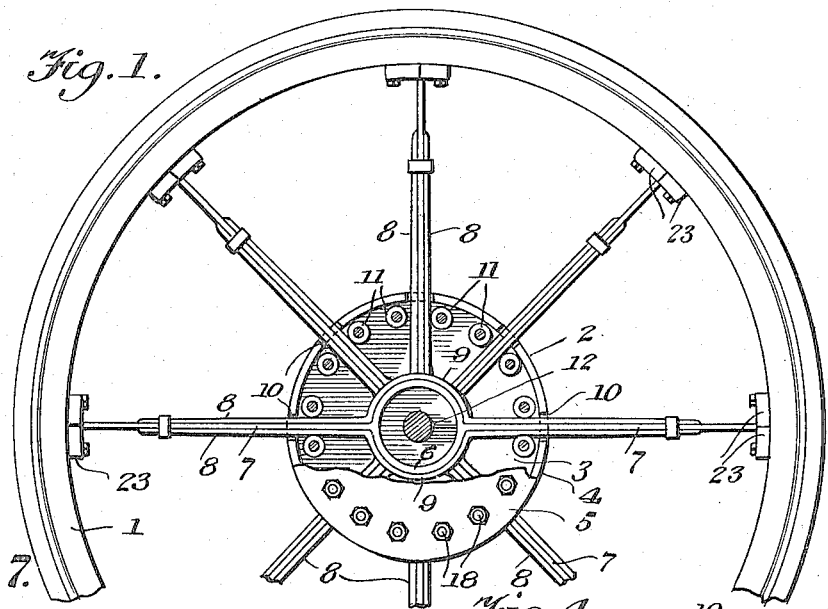
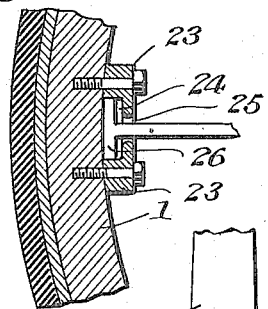
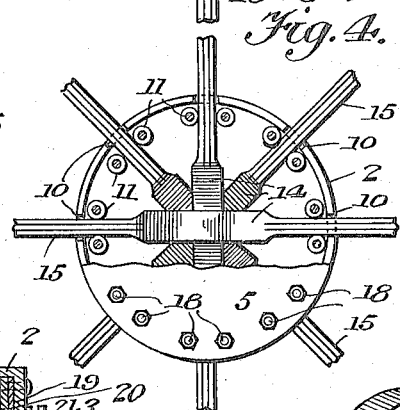
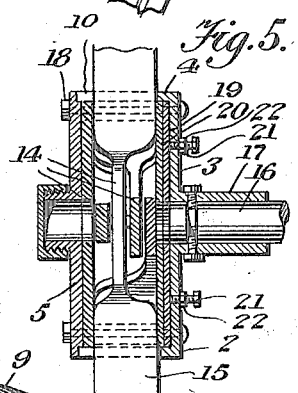
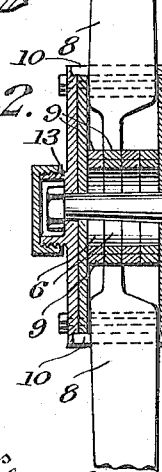
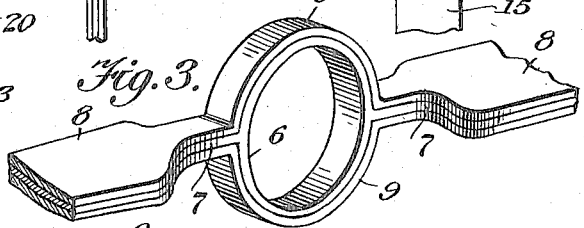
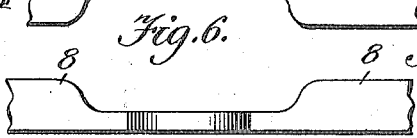
Witnesses
Inventor
J. H. Lysinger
Attorney
THE NORRIS PETERS CO., PHOTO-LITHO., WASHINGTON, D. C.

UNITED STATES PATENT OFFICE.

JOSEPH H. LYSINGER, OF AURORA, NEBRASKA.

SPRING-WHEEL.

1,135,458.　　　　　Specification of Letters Patent.　　Patented Apr. 13, 1915.

Application filed June 1, 1914. Serial No. 842,042.

*To all whom it may concern:*

Be it known that I, JOSEPH H. LYSINGER, a citizen of the United States of America, residing at Aurora, in the county of Hamilton and State of Nebraska, have invented certain new and useful Improvements in Spring-Wheels, of which the following is a specification.

The invention relates to an improvement in spring wheels, and particularly to a spring wheel wherein the spokes are of resilient construction, the diametrically alined spokes being constructed to provide a single element, with the respective elements arranged for independent movement to provide the desired resiliency.

In construction the improved wheel, I provide a hub section and a rim section, a series of spokes connecting the hub and rim section and being arranged for relatively independent movement within the hub section, the diametrically opposed spokes constituting a single element, the load strain being taken up by that spoke element disposed in parallelism to the surface over which the wheel is traveling, the relative movement of the elements permitting the necessary independent movement of the parts of the wheel.

The invention in the preferred form of details will be described in the following specification, reference being had particularly to the accompanying drawings, in which:—

Figure 1 is a broken view in side elevation showing the improved wheel, one type of spoke construction being shown. Fig. 2 is a sectional view through the hub member illustrating the disposition of the spoke elements of the form shown in Fig. 1. Fig. 3 is a broken perspective of one of the spoke elements illustrated in Fig. 1. Fig. 4 is a broken side elevation showing a different form of spoke element. Fig. 5 is a transverse section through Fig. 4. Fig. 6 is a broken plan showing the formation of the relatively outer spoke elements in the hub engaging portions, of the form shown in Fig. 1. Fig. 7 is a longitudinal sectional view partly in elevation illustrating the connection of the spokes to the wheel rim or felly.

In carrying out the present invention, I provide a series of spoke elements connected to the wheel rim in a manner to permit a slight radial movement of the spoke, and loosely mounted within the hub, the diametrically alined spokes being constructed as a single element and each of said elements being independently movable to a limited extent.

In constructing the improved wheel, I provide a rim or felly 1, and a hub member 2, the latter being formed to include a disk 3, having an edge flange 4 of the full depth of the hub member, and a closing plate 5, the construction providing a hollow cylindrical shell, of the form shown.

In Figs. 1, 2, and 3, I have shown one type of spoke member, it being understood that the term member includes two spokes occupying a diametrically alined position in the wheel structure. In the type illustrated in the said Figs. 1, 2, and 3, the said spoke member comprises a length of resilient material corresponding to the diametric length of the wheel. The said spoke member is centrally formed to provide a ring 6, from which extend at diametric points blades or strips 7 constituting the spokes proper. To reinforce the spoke member, I prefer to thicken the said member by adding additional spring strips or leaves 8 thereto, disposing them on opposite sides of the spoke proper and each being centrally formed with a semi-circular extension 9, to be disposed on opposite sides of the ring 6. The reinforcing members terminate short of the felly engaging ends of the spoke member, so that for the greater portion of its length the spoke member is composed of three thicknesses of material, with obvious advantages as to strength and wear.

The ring centers of the spoke members are, in assembling the wheel, arranged within the hub member, and in normal position occupy a position concentric with the center of said hub member. To permit this arrangement, the flange 4 of the hub member is slotted as at 10 to permit the passage therethrough of the spokes proper, and antifriction rollers 11 are arranged within the hub member on opposite sides of the spoke proper so as to permit relative movement of the parts without binding.

As it is essential that the spokes lie in the same plane, it is obviously imperative that the spoke members have their ring portions 6 offset so that while the spokes proper lie in the same plane, the ring members will lie side by side, as fully apparent in Fig. 2 of the drawings. Furthermore, the ring members are reduced in thickness, so that the aggregate thickness of all of said members equal the width of the spoke proper. This form is particularly advantageous in use with wheels in which the spindle 12 passes through the hub member, the ring portion 6 being of materially greater diameter than the spindle. The respective side plates 3 and 5 of the hub member are formed with sleeve extensions 13 for coöperation with the spindle as is usual in wheel connections of this type.

In Figs. 4 and 5 is shown a slightly different form of spoke member, wherein the intermediate portion 14 corresponding approximately in length to the diameter of the ring 6 of the other type, is disposed at right angles to the end portions 15, which latter correspond in all respects to the spokes proper 7 of the other type. The portions 14 are particularly arranged with respect to each spoke member, so that when positioned within the hub member, they will lie side by side, as shown in Fig. 5, that is in superimposed relation axially of the hub. To this end, the portions 14 are offset from the longitudinal center of the member, the portions occupying the intermediate position in the hub member being offset less than the end portions. This type of spoke member is particularly advantageous where the axle spindle, as 16, is mounted in a sleeve extension 17 projecting from the inner side of the hub member, and does not pass entirely through the hub member.

In both types, the removable plate 5 of the hub member is secured by bolts 18, and between the plates 3 and 5 and the respective spoke members are arranged adjustment plates 19 and 20, the former being of metal and the latter preferably of fiber. On one side, preferably through the plate 3, are arranged adjusting screws 21 having lock nuts 22, whereby the adjustment plates may be moved as required to take up any looseness at this point. In both types, the outer or free ends of the spoke members are connected to the wheel rim 1 in a manner to permit a slight radial play of said members. To this end, I secure brackets 23 at appropriate points on the inner surface of the rim, forming in the outer side of these brackets recesses 24 communicating with central openings 25 in the bottoms of the brackets. The ends of the spokes proper are formed with T-heads 26, adapted to rest in the recesses 24, the depths of these recesses being slightly greater than the corresponding dimensions of the heads, whereby a slight longitudinal play of the spoke proper, which of course extends through the opening 25 is permitted. In both forms it is obvious that the load strain is borne by the spoke, which at the particular time, is parallel with the surface over which the wheel is traveling, and that due to its resiliency a yielding action will be had, as desired. As the spokes proper will necessarily bend to a slight extent during this movement, the longitudinal relative movement described, will compensate therefor.

Any form of tire may be used in the rim, and the spokes of each form may be reinforced as described in connection with the first form, or may be integral sections, there being no limitation intended in this respect.

What is claimed is:—

1. A spring wheel including a felly, a hub member, and spokes arranged intermediate the hub member and felly, the diametrically alined spokes constituting a single member, each of said members being arranged in superimposed relation axially of the hub member, and being each mounted for free and independent movement at right angles to the axial line of said hub member.

2. A spring wheel including a felly, a hub member, and spokes arranged intermediate the hub member and felly, the diametrically alined spokes constituting a single member, each of said members being formed with relatively offset sections arranged in superimposed relation axially of the hub member, and being each mounted for free and independent movement at right angles to the axial line of said hub member.

3. A spring wheel including a felly, a hub member, and spokes arranged intermediate the hub member and felly, the diametrically alined spokes constituting a single member, each of said members being arranged in superimposed relation axially of the hub member, and being each mounted for free and independent movement at right angles to the axial line of said hub member, and means for connecting the outer ends of the spoke members to the wheel rim to permit a slight radial independent movement of said members.

In testimony whereof I affix my signature in presence of two witnesses.

JOSEPH H. LYSINGER.

Witnesses:
T. R. WORK,
M. J. FERGUSON.

Copies of this patent may be obtained for five cents each, by addressing the "Commissioner of Patents Washington, D. C."